United States Patent [19]
LaCount

[11] Patent Number: 5,996,878
[45] Date of Patent: Dec. 7, 1999

[54] METHOD OF WELDING 5-G PIPE

[75] Inventor: Dale F. LaCount, Alliance, Ohio

[73] Assignee: McDermott Technology, Inc., New Orleans, La.

[21] Appl. No.: 08/803,744

[22] Filed: Feb. 22, 1997

[51] Int. Cl.⁶ .................................................. B23K 9/00
[52] U.S. Cl. .............................. 228/25; 228/29; 228/32; 228/45; 228/49.3; 228/212; 228/168; 219/59.1
[58] Field of Search ................................. 228/25, 29, 32, 228/45, 49.3, 212, 168, 165, 44.5, 48; 219/59.1

[56] References Cited

U.S. PATENT DOCUMENTS

| | | | |
|---|---|---|---|
| 4,145,593 | 3/1979 | Merrick et al. | 219/60 A |
| 4,176,269 | 11/1979 | Merrick et al. | 219/60 A |
| 4,525,616 | 6/1985 | Slavens | 219/60 R |
| 4,687,899 | 8/1987 | Acheson | 219/76.14 |
| 5,099,098 | 3/1992 | Burgoon | 219/60 A |
| 5,227,601 | 7/1993 | Black | 219/61 |
| 5,298,710 | 3/1994 | Acheson et al. | 219/76.14 |

*Primary Examiner*—Patrick Ryan
*Assistant Examiner*—M. Alexandra Elve
*Attorney, Agent, or Firm*—R. J. Edwards; Eric Marich

[57] ABSTRACT

A method for welding horizontal pipe along the inner diameter of the pipe and outer diameter of the pipe to prevent weld root defects on the bottom half of the pipe.

5 Claims, 2 Drawing Sheets

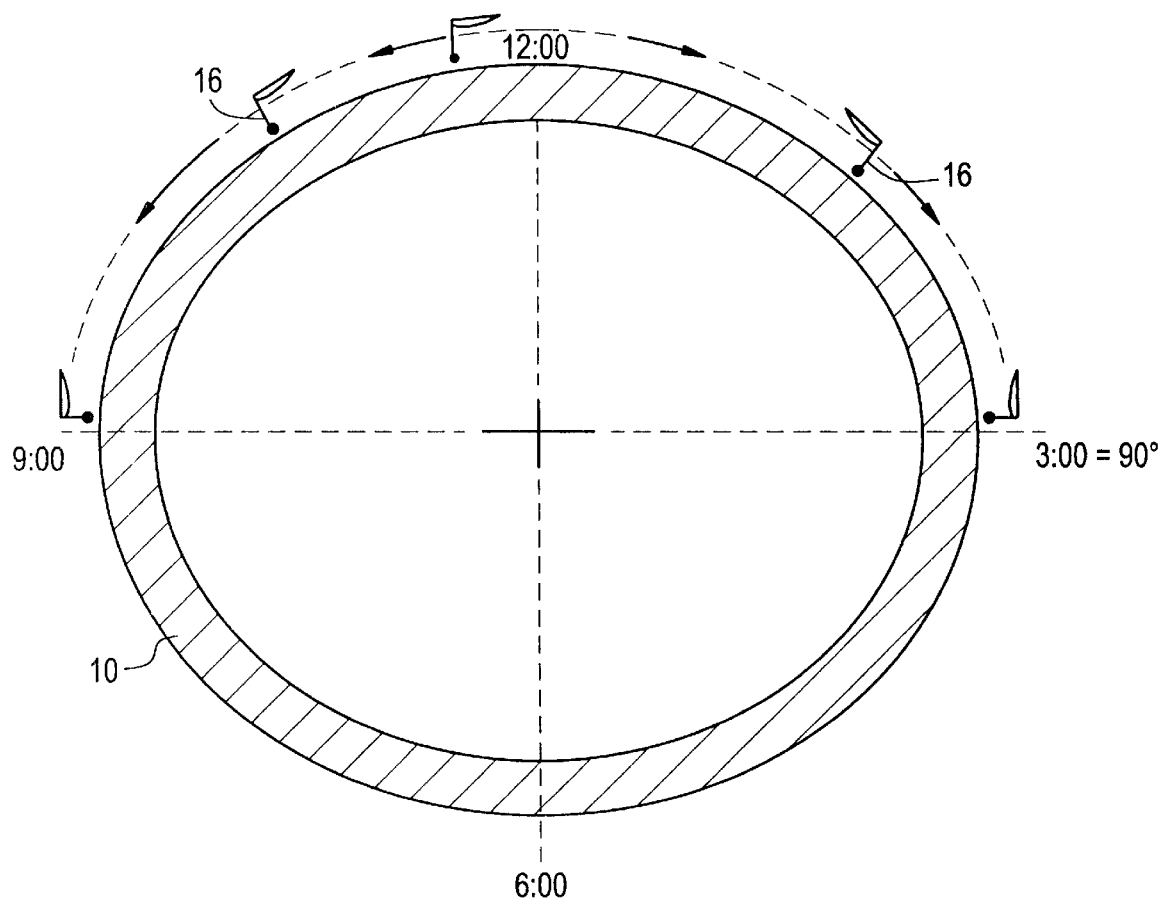

METHOD OF WELDING 5-G PIPE

BACKGROUND OF THE INVENTION

1. Field of the Invention

The present invention pertains to a method of welding pipe and, in particular, to making the top half of the weld with a welding apparatus at the exterior of the pipe and making the bottom half of the weld within the interior of the pipe.

2. Description of the Related Art

In many pipe welding applications, the pipe cannot be rotated during welding. Welding is done with the pipe stationary in a horizontal, i.e., 5-G position, rotating a welding apparatus around the pipe to make the weld. The direction of gravitational forces changes relative to the welding direction as the weld progresses around the pipe. Because of this, some welding positions are more difficult to weld than others. This is particularly true on the lower half of the pipe, where smaller weld pools are typically used to achieve sound welds with acceptable weld bead profiles on the inside diameter of the pipe. This limits weld deposition rates.

The most difficult positions to make a good weld are between the 4:00 o'clock and 8:00 o'clock positions of the pipe, where the weld is being made overhead. In these positions, gravity tends to pull the molten weld pool away from the inside of the pipe, making it more difficult to maintain full penetration and positive root reinforcement.

It is an object of this invention to make a 5-G weld around the diameter of a pipe causing full penetration of root welds and avoiding weld root defects caused by gravitational forces.

SUMMARY OF THE INVENTION

It is a primary object of this invention to provide an improved method for welding pipe in a 5-G position. The method of the present invention involves the following steps.

First, a first pipe segment is aligned with a second pipe segment in a horizontal or 5-G position. Upon lining up the weld preps of the pipe segments, a groove is formed between the first pipe section and the second pipe section. The groove extends around the diameter of the pipes. Next, a welding apparatus is positioned within the pipes. The welding apparatus is positioned at a certain distance from the groove. The welding apparatus is activated and rotated downward along the bottom half of the weld groove. Next, the welding apparatus is positioned outside of the pipe. The welding apparatus is then activated and rotated downward along the upper half of the weld groove.

The present invention has several advantages over known welding methods. The weld surface of the pipe inner diameter on the bottom half of the pipe is smoother and more flush than welds made from the outer diameter. The overall appearance, smoothness, and consistency of the weld bottom half inner diameter is improved. The weld surface of the pipe bottom half inner diameter is nearly flush with the pipe inner diameter. This will improve fatigue resistance.

The weld surface of the bottom half outer diameter of the pipe may not be as smooth, but is easily accessible for inspection and cleanup, if necessary. It will also be consumed by the hot pass. Essentially, the completed weld will have only weld crown surfaces exposed, with no exposed root surfaces on the inside or outside of the bottom half of the pipe.

Further, the present invention allows the operator to easily see and track the outer diameter as the bottom half weld is being made from the inner diameter of the pipe.

Further, the present invention offers more tolerance of joint mistracking since there is not the concern of the weld pool riding up onto the side wall and causing suckback (concavity) on the weld inner diameter. The torch does not have to be made narrow enough, or the groove wide enough, to enable the welding apparatus to get close enough to the bottom of the weld prep to make a good root weld. This makes it easier to develop sound weld parameters which are more tolerant to variations. Additionally, the ability to use a more narrow weld groove reduces costs and machining (less material removal, and welding, less time and filler metal to fill a joint).

Further, the present invention allows welding from the inner diameter and the outer diameter to be done simultaneously, with the hot pass put in from the outer diameter, while the root pass is put in from the inner diameter on the bottom half of the pipe. This would greatly reduce overall time required to complete welds.

The method may utilize various types of welding, including plasma arc welding, flux cored arc welding, gas tungsten arc welding, and pulsed gas metal arc welding.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 3 is a front view of a welding apparatus outside of the pipe section rotating downwardly along the upper half of the weld groove.

DESCRIPTION OF THE PREFERRED EMBODIMENT

Figure 1:
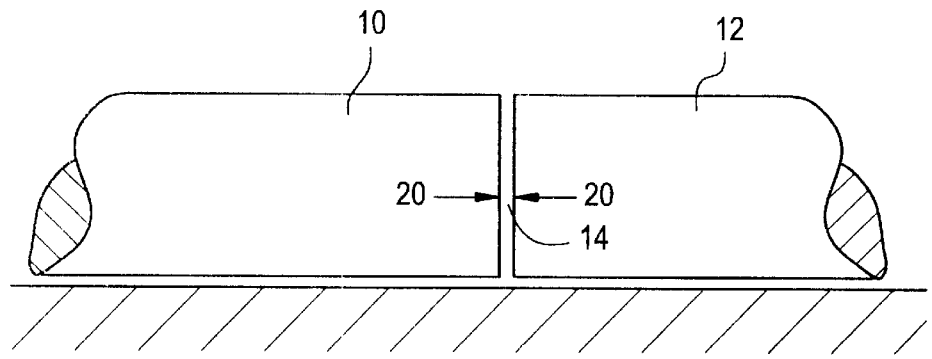
FIG. 1 is a side view of abutting ends of pipe sections in the 5-G position.

Referring to FIG. 1, a first pipe section 10 is aligned with a second pipe section 12 in the horizontal or 5-G position. A groove 14 is formed between the first pipe section 10 and the second pipe section 12.

Figure 2:
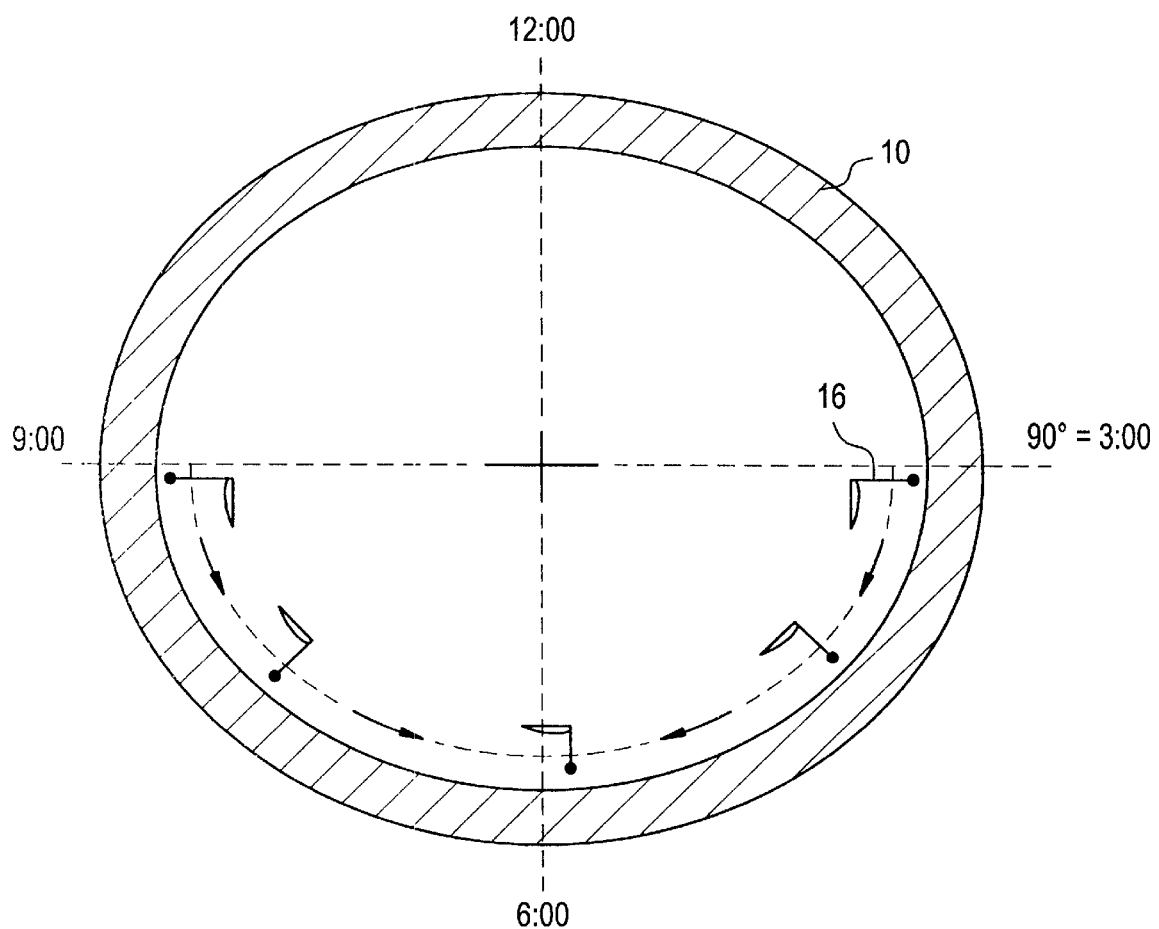
FIG. 2 is a front view of the weld apparatus within the pipe section rotating around the lower half of the weld groove.

Referring to FIG. 2, a welding apparatus 16 is positioned within the interior of the pipe sections 10, 12. The welding apparatus 16 is rotated downwardly along the lower half of the weld groove 14, welding together the bottom halves of pipe sections 10, 12. The welding may be performed manually by torch or by using an automated welding machine. It may be accomplished continuously from 3:00 to 9:00, or in two parts (3:00 to 6:00; 9:00 to 6:00).

Referring to FIG. 3, the welding apparatus 16 is positioned outside of the pipe sections 10, 12. The welding apparatus 16 is rotated downwardly along the upper half of the weld groove, welding together the upper portions of the first pipe section 10 and second pipe section 12. This may be accomplished continuously from 9:00 to 3:00, or in two parts (12:00 to 3:00; 12:00 to 9:00).

The welding of the lower and upper halves of the welding groove may be done simultaneously.

While a specific embodiment of the invention has been shown and described in detail to illustrate the application of the principles of the invention, it will be understood that the invention may be embodied differently without departing from such principles.

What is claimed is:

1. An improved welding method performed in two separate welding steps for welding a first section of a horizontal pipe to a second section of a horizontal pipe with full penetration of the root welds and with decreased weld root defects caused by gravitational forces, the method comprising:

aligning the first section to the second section;

forming a circular weld groove between the first section and second section;

positioning a welding apparatus within the pipe;

performing the first welding step by welding a bottom half of the weld groove from the interior of the pipe;

positioning the welding apparatus outside of the pipe; and performing the second welding step by welding an upper half of the weld groove from the exterior of the pipe.

2. The welding method according to claim 1, further comprising:

making a weld preparation at an end of the first section; and making a weld preparation at an end of the second section.

3. The welding method according to claim 1 wherein the welding of the bottom half of the weld groove is done simultaneously with the welding of the upper half of the weld groove.

4. An improved welding method performed in two separate welding steps for welding a first section of a horizontal pipe to a second section of a horizontal pipe with full penetration of the root welds and with decreased weld root defects caused by gravitational forces, the method comprising:

aligning the first section of the pipe with the second section of the pipe;

forming a weld groove between the first section of the pipe and the second section of the pipe;

positioning a welding apparatus within the pipe;

performing the first welding step from the interior of the pipe by rotating the welding apparatus downward from the 3:00 position of the weld groove to the 6:00 position of the weld groove, repositioning the welding apparatus within the pipe, and rotating the welding apparatus downward from the 9:00 o'clock position of the weld groove to the 6:00 o'clock position of the weld groove;

positioning the welding apparatus outside of the pipe; and performing the second welding step from the exterior of the pipe by rotating the welding apparatus downward from the 12:00 o'clock position of the weld groove to the 3:00 o'clock position of the weld groove, repositioning the welding apparatus outside of the pipe, and rotating the welding apparatus downward from the 12:00 o'clock position of the weld groove to the 9:00 o'clock position of the weld groove.

5. An improved welding method performed in two separate welding steps for welding a first section of a horizontal pipe to a second section of a horizontal pipe with full penetration of the root welds and with decreased weld root defects caused by gravitational forces, the method comprising:

aligning the first section of the pipe with the second section of the pipe;

forming a weld groove between the first section of the pipe and the second section of the pipe;

positioning a welding apparatus within the pipe;

performing the first welding step from the interior of the pipe by rotating the welding apparatus downward from the 3:00 position of the weld groove to the 6:00 position of the weld groove and then upward from the 6:00 position of the weld groove to the 9:00 position of the weld groove;

positioning the welding apparatus outside of the pipe; and performing the second welding step from the exterior of the pipe by rotating the welding apparatus upward from the 9:00 position of the weld groove to the 12:00 position of the weld groove and then downward from the 12:00 position of the weld groove to the 3:00 position of the weld groove.

* * * * *